(12) United States Patent
Hosoi et al.

(10) Patent No.: US 10,650,856 B1
(45) Date of Patent: May 12, 2020

(54) THERMALLY-ASSISTED MAGNETIC RECORDING HEAD HAVING OPTIMAL REFLECTING POSITION INSIDE WAVEGUIDE

(71) Applicant: SAE Magnetics (H.K.) Ltd., Hong Kong (HK)

(72) Inventors: Ryo Hosoi, Hong Kong (HK); Seiichi Takayama, Hong Kong (HK)

(73) Assignee: SAE MAGNETICS (H.K.) LTD., Hong Kong (HK)

( * ) Notice: Subject to any disclaimer, the term of this patent is extended or adjusted under 35 U.S.C. 154(b) by 0 days.

(21) Appl. No.: 16/367,224

(22) Filed: Mar. 27, 2019

(51) Int. Cl.
| | |
|---|---|
| *G11B 11/105* | (2006.01) |
| *G11B 13/04* | (2006.01) |
| *G11B 5/48* | (2006.01) |
| *G11B 5/00* | (2006.01) |
| *G11B 11/24* | (2006.01) |
| *G11B 5/60* | (2006.01) |
| *G11B 13/08* | (2006.01) |

(52) U.S. Cl.
CPC .......... *G11B 13/04* (2013.01); *G11B 5/4826* (2013.01); *G11B 5/6088* (2013.01); *G11B 11/24* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 9,558,769 B1 * | 1/2017 | Kim | ......................... | G11B 5/314 |
| 9,870,787 B1 * | 1/2018 | Wessel | .................... | G01J 5/10 |
| 9,960,570 B1 * | 5/2018 | Goggin | .................... | H01S 5/14 |
| 2011/0205661 A1 | 8/2011 | Komura et al. | | |
| 2012/0155232 A1 | 6/2012 | Schreck et al. | | |
| 2012/0201491 A1 * | 8/2012 | Zhou | ...................... | G02B 6/124 |
| | | | | 385/14 |
| 2015/0154988 A1 | 6/2015 | Takei et al. | | |
| 2015/0364899 A1 * | 12/2015 | Tatah | ...................... | H01S 5/141 |
| | | | | 372/20 |
| 2015/0380035 A1 | 12/2015 | Takei et al. | | |

FOREIGN PATENT DOCUMENTS

JP 2012084216 A 4/2012

\* cited by examiner

*Primary Examiner* — Tan X Dinh

(57) ABSTRACT

A thermally assisted magnetic head including a slider and a light source-unit. The slider includes a slider substrate and a magnetic head part. The light source-unit includes a laser diode and a sub-mount. The magnetic head part includes a medium-opposing surface, a light source-opposing surface and a waveguide which guides laser light from the light source-opposing surface to the medium-opposing surface. The thermally assisted magnetic head includes an optimal-structure which the following optimizing conditional expression, concerning an inlet-optical path length L1 of an inlet-interval of the waveguide, and an outlet-optical path length L2 of an outlet-interval, is satisfied, $m_1 \times L1 = L2$ ($m_1$ is a natural number).

11 Claims, 18 Drawing Sheets

THERMALLY-ASSISTED MAGNETIC RECORDING HEAD HAVING OPTIMAL REFLECTING POSITION INSIDE WAVEGUIDE

BACKGROUND

Field of the Invention

The present invention relates to a thermally assisted magnetic head recording data on a magnetic recording medium by thermally assisted magnetic recording using near-field light, a head gimbal assembly and a hard disk drive each having the thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which the light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

SUMMARY OF THE INVENTION

There is a following problem in the thermally assisted magnetic head, having the above-described conventional structure. The problem is caused by optical feedback of a laser diode.

When laser light is emitted from the laser diode as the light source, part of laser light is reflected on the surface of the slider (inlet of the waveguide), after that, the reflected light returns to the laser diode as optical feedback.

Besides, laser light is also reflected not only on the inlet of the waveguide but also on the parts (also referred to as laser light reflecting parts) such as the inside of the waveguide, a near-field light generating element (element for generating near-field light) and the surface of the recording medium or the like. The reflected laser light returns to the laser diode as optical feedback, in all these cases.

In this case, standing wave conditions collapse by mixing optical feedback, in the laser diode, unstable action, which is called "mode hopping", which oscillation wavelength change suddenly, is caused. Thereby, optical power of the laser diode become unstable. Then, a recording characteristic of the thermally assisted magnetic head becomes unstable.

If reflectance (reflection rate), of the respective laser light reflecting parts, is lowered, thereby optical feedback is lowered. In this case, the part, which influences largest on the mode hopping, is the near-field light generating element. Therefore, it is preferable that reflectance of the near-field light generating element is lowered.

However, because the near-field light generating element is formed with metal, lowering the reflectance is limited.

On this point, because the waveguide is formed with dielectric, it is possible that reflectance is lowered, only on the inlet or inside of the waveguide. However, it is extremely difficult for the reflected light to become 0.

On the other hand, when the reflecting-position of the laser light is shifted, it brings shifting an interference pattern of laser light. Therefore, if the reflecting-position, of laser light in inside of the waveguide, is shifted, wavelength dependence of optical feedback change, thereby there is a possibility that unstableness of optical power is lowered.

However, the effective suggestion, concerning the optimal reflecting-position in inside of the waveguide, is not conventionally known, on the viewpoint that unstableness of optical power caused by the mode-hopping is lowered.

Hence the present invention is made to solve the above problem, and it is an object to provide a thermally assisted magnetic head, that the reflecting-position in inside of the waveguide is set up to the most suitable position so that the unstableness of optical power caused by the mode-hopping is lowered, the head gimbal assembly and the hard disk drive having the thermally assisted magnetic head.

To solve the above problem, the present invention is a thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and an outlet-optical path length L2 of an outlet-interval from the reflecting-position to the medium-opposing surface, is satisfied.

$m_1 \times L1 = L2$ ($m_1$ is a natural number)

Further, the present invention provides a thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and a light-source optical path length L3 of an internal waveguide of the laser diode, is satisfied.

$m_2 \times L1 = L3$ ($m_2$ is a natural number)

Further, the present invention provides a thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning a light-source optical path length L3 of an internal waveguide of the laser diode and a waveguide-optical path length L4 of all interval along length direction of the waveguide, is satisfied.

$m_3 \times L4 = L3$ ($m_3$ is a natural number)

Further, the present invention provides a thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which at least any two of the following the first, second, third optimizing conditional expressions, concerning an inlet-optical path length L1 of an inlet-interval of the waveguide from the light source-opposing surface to a reflecting-position of the laser light, an outlet-optical path length L2 of an outlet-interval from the reflecting-position to the medium-opposing surface, a light-source optical path length L3 of an internal waveguide of the laser diode and a waveguide-optical path length L4 of all interval along length direction of the waveguide, are satisfied.

$m_1 \times L1 = L2$ ($m_1$ is a natural number)  first optimizing conditional expression $m_2 \times L1 = L3$ ($m_2$ is a natural number)  second optimizing conditional expression $m_3 \times L4 = L3$ ($m_3$ is a natural number)  third optimizing conditional expression Further, it is possible that the waveguide includes a first dielectric member arranged the light source-opposing surface side and a second dielectric member arranged the medium-opposing surface side, and the boundary part, between the first dielectric member and the second dielectric member, is defined as the reflecting-position.

Further, the present invention provides a head gimbal assembly including a thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and an outlet-optical path length L2 of an outlet-interval from the reflecting-position to the medium-opposing surface, is satisfied.

$m_1 \times L1 = L2$ ($m_1$ is a natural number)

Further, the present invention provides a head gimbal assembly including a thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and a light-source optical path length L3 of an internal waveguide of the laser diode, is satisfied.

$m_2 \times L1 = L3$ ($m_2$ is a natural number)

Further, the present invention provides a head gimbal assembly including a thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning a light-source-optical path length L3 of an internal waveguide of the laser diode and a waveguide-optical path length L4 of all interval along length direction of the waveguide, is satisfied.

$m_3 \times L4 = L3$ ($m_3$ is a natural number)

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and an outlet-optical path length L2 of an outlet-interval from the reflecting-position to the medium-opposing surface, is satisfied.

$m_1 \times L1 = L2$ ($m_1$ is a natural number)

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning an inlet-optical path length L1 of an inlet-interval of the waveguide from the light source-opposing surface to a reflecting-position of the laser light, and a light-source optical path length L3 of an internal waveguide of the laser diode, is satisfied.

$m_2 \times L1 = L3$ ($m_2$ is a natural number)

Then, the present invention provides a hard disk drive including a head gimbal assembly having a thermally assisted magnetic head, and a magnetic recording medium opposing the thermally assisted magnetic head, the thermally assisted magnetic head including: a slider; and a light source-unit joined to the slider, the slider includes a slider substrate and a magnetic head part formed on the slider substrate, the light source-unit includes a laser diode and a sub-mount which the laser diode is joined; the magnetic head part includes a medium-opposing surface opposing a magnetic recording medium, a light source-opposing surface arranged rear side of the medium-opposing surface and a waveguide which guides laser light, output from the laser diode, from the light source-opposing surface to the medium-opposing surface, the thermally assisted magnetic head includes an optimal-structure which the following optimizing conditional expression, concerning a light-source optical path length L3 of an internal waveguide of the laser diode and a waveguide-optical path length L4 of all interval along length direction of the waveguide, is satisfied.

$m_3 \times L4 = L3$ ($m_3$ is a natural number)

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
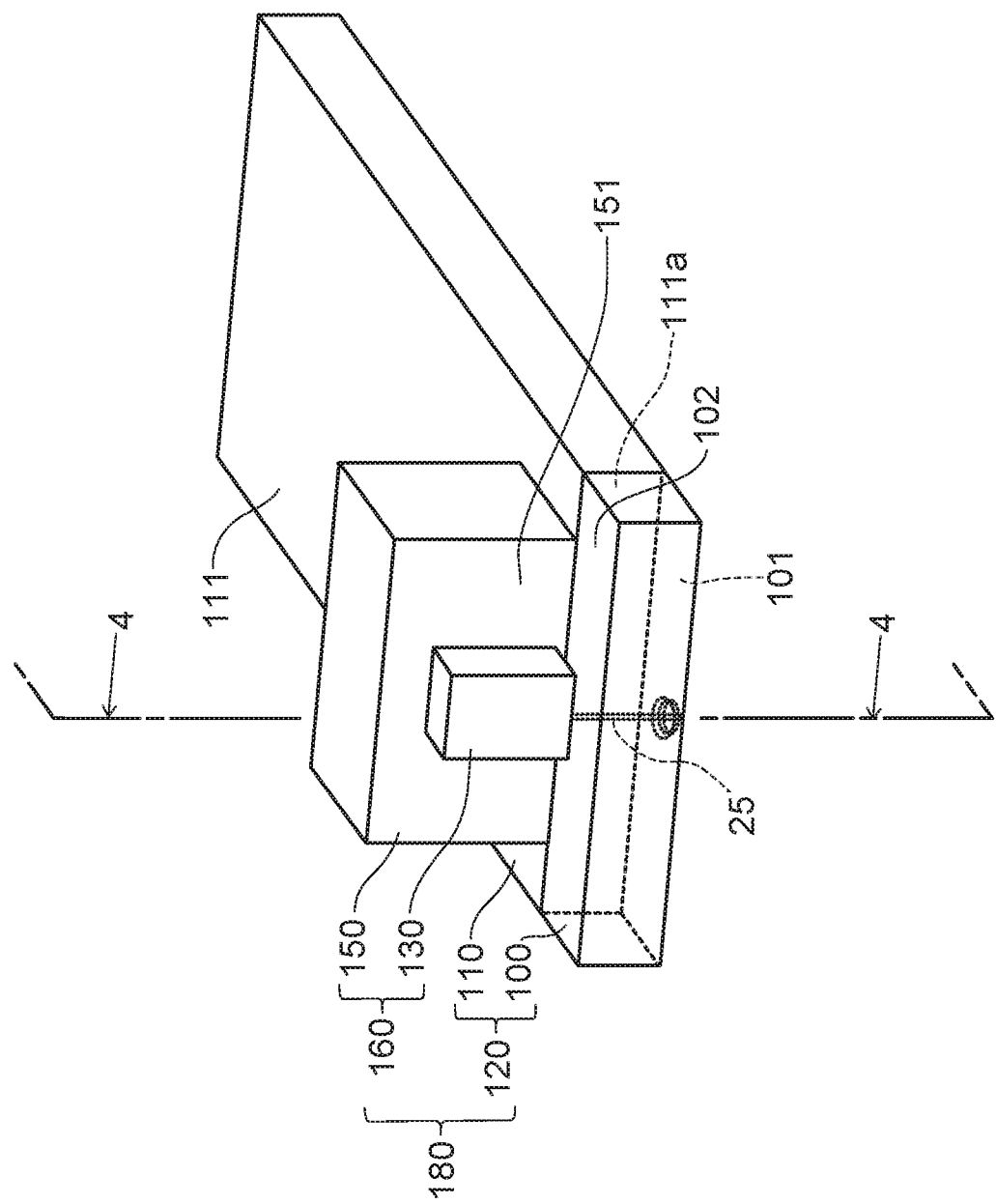
FIG. 1 is a perspective view of the thermally assisted magnetic head according to an embodiment of the present invention.
Figure 2:
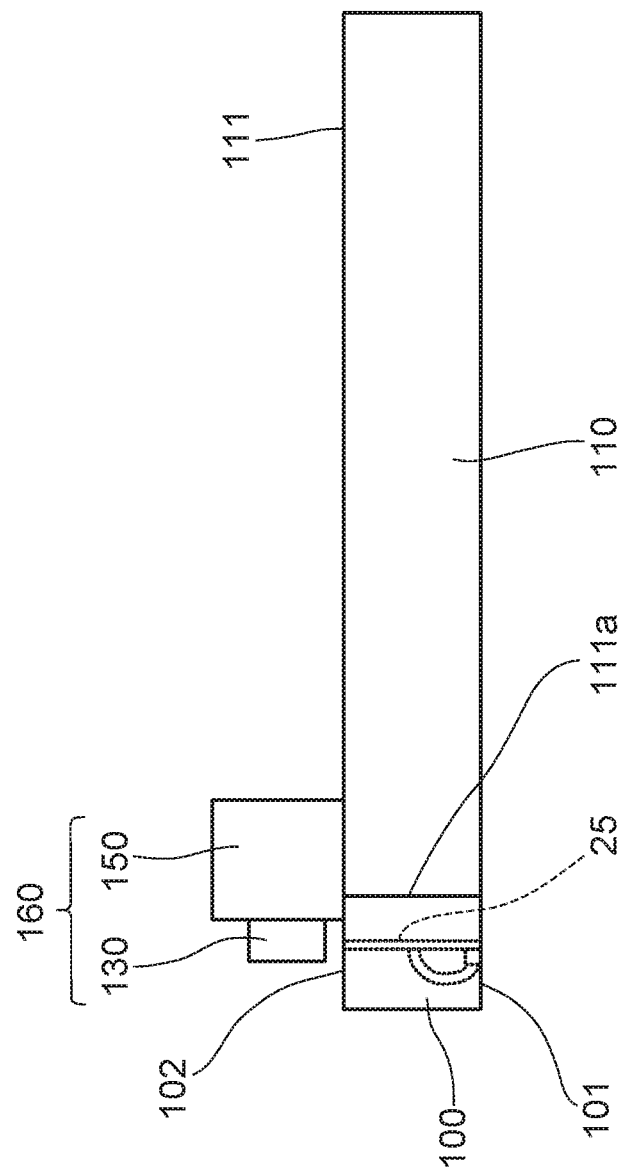
FIG. 2 is a side elevation view of the thermally assisted magnetic head according to the embodiment of the present invention.
Figure 3:
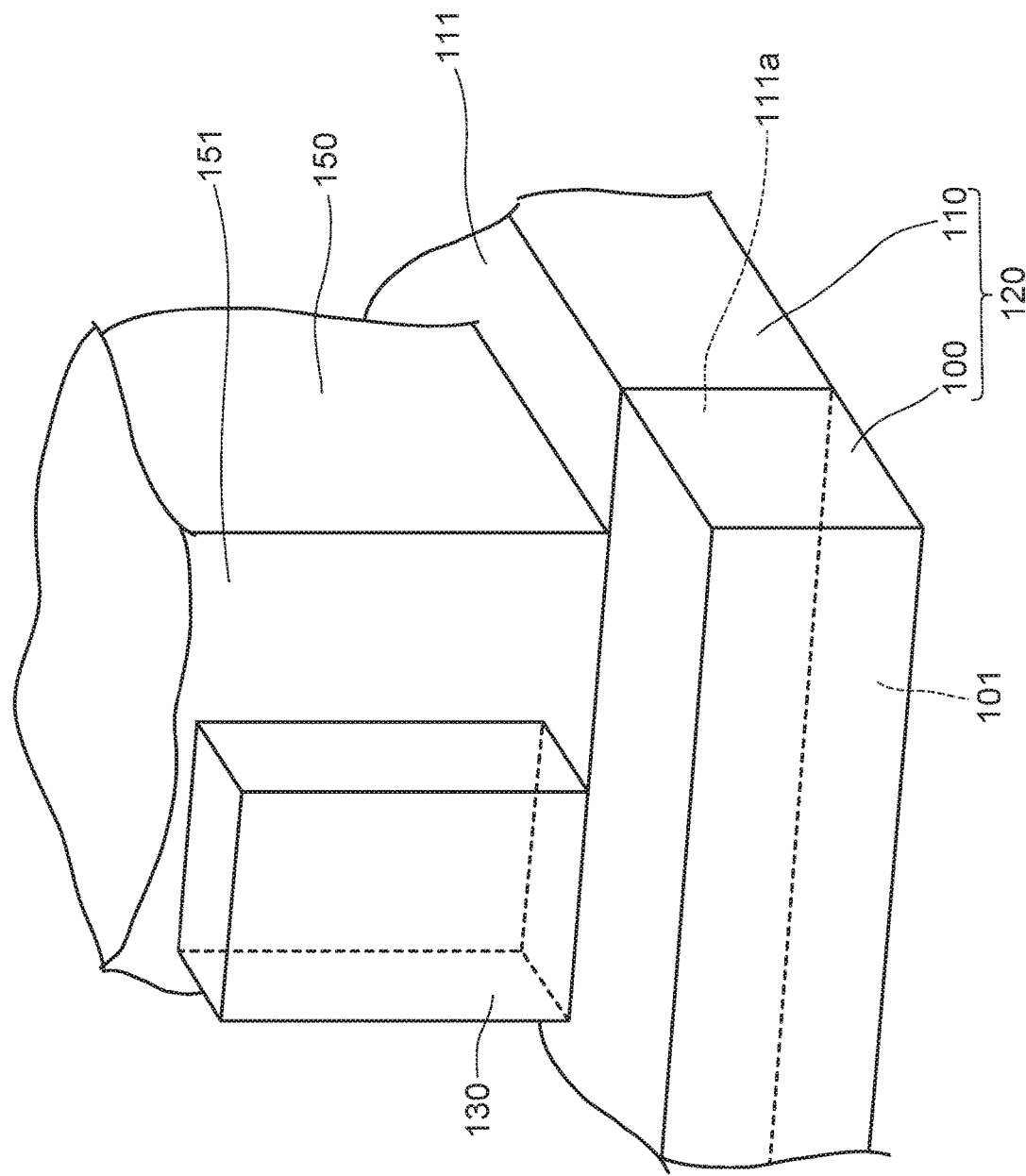
FIG. 3 is a perspective view, with enlargement, of the principal part of the thermally assisted magnetic head.
Figure 4:
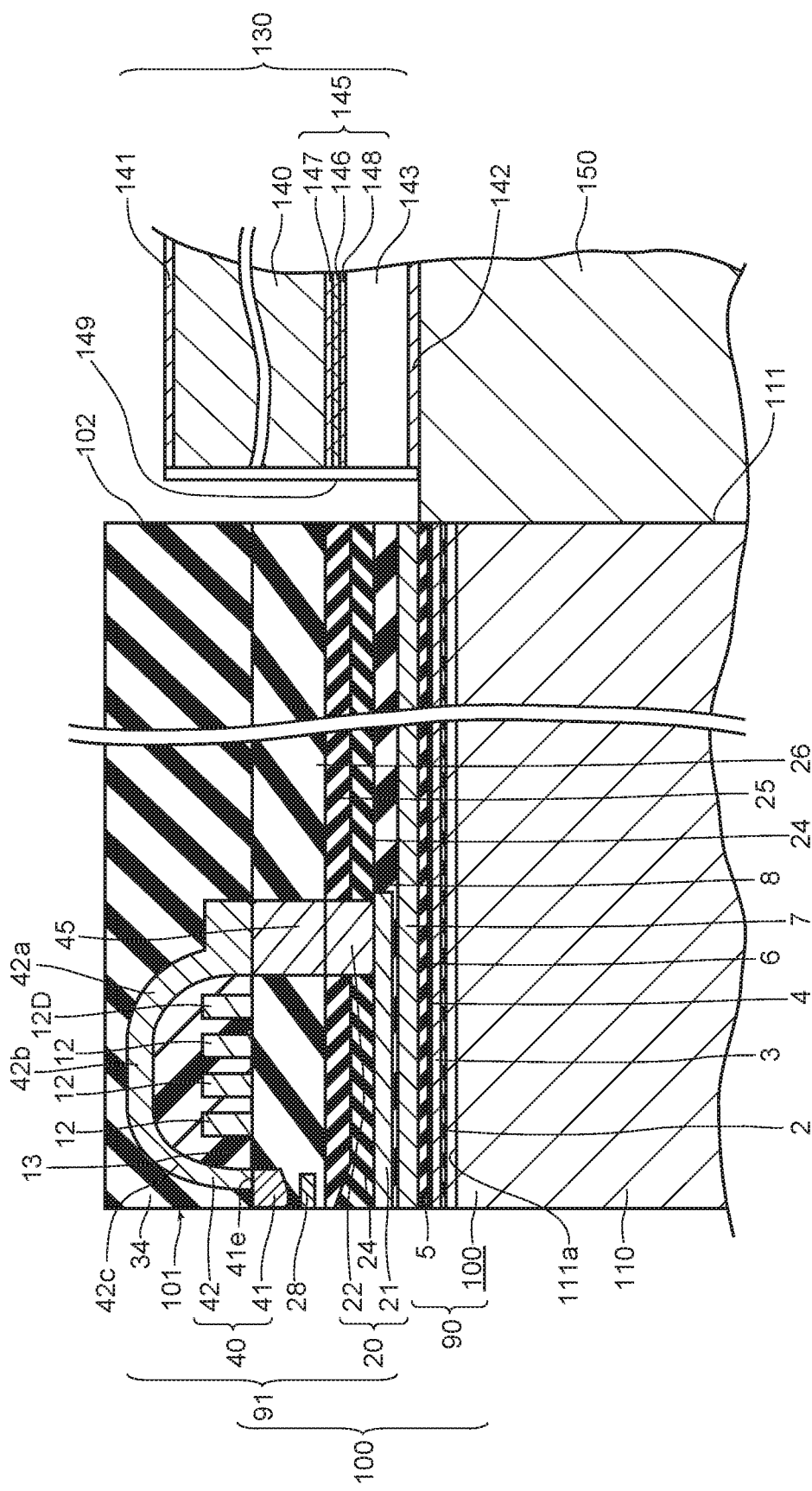
FIG. 4 is a sectional view of the principal part taken along the line 4-4 in FIG. 1.
Figure 5:
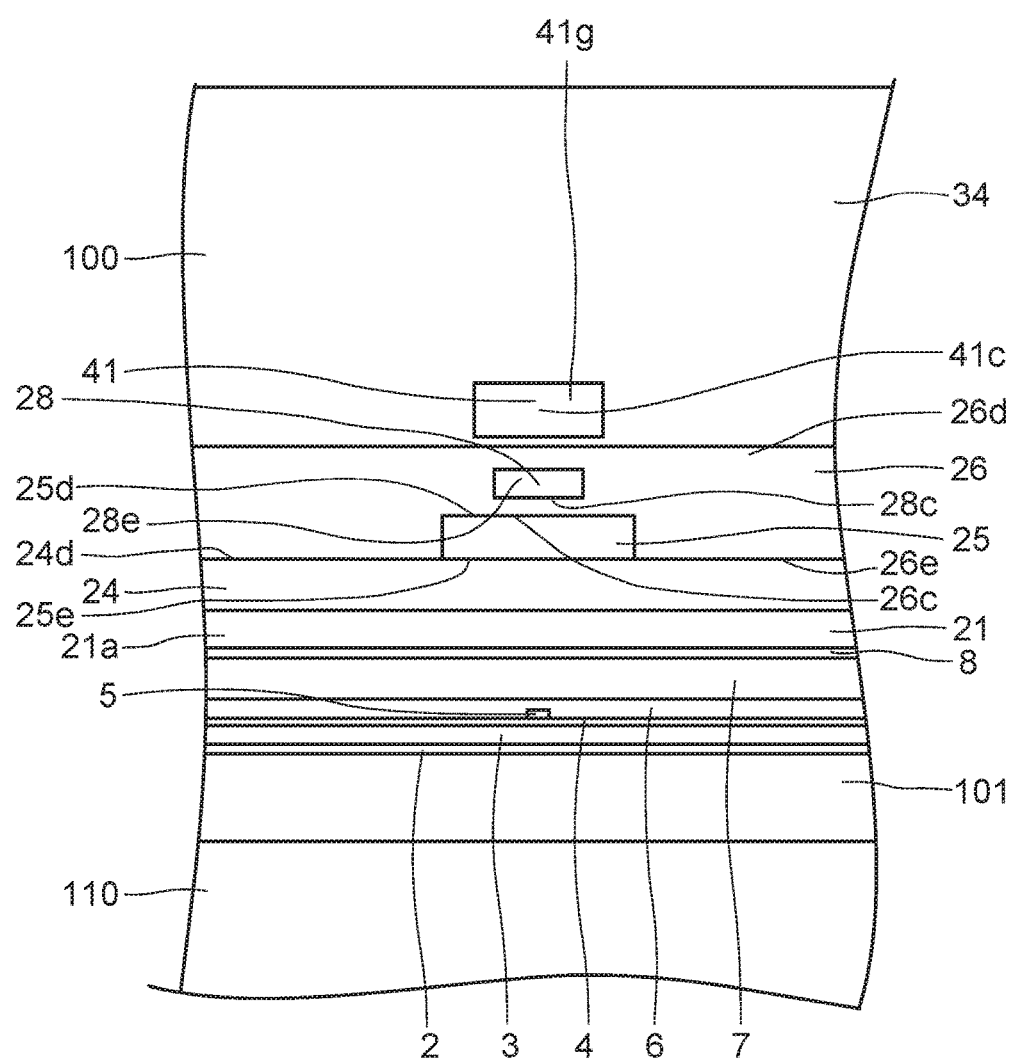
FIG. 5 is a front view, partially omitted, illustrating an air bearing surface of a magnetic head part.

To begin with, structure of the thermally assisted magnetic head according to the embodiment of the present invention will be explained with reference to FIG. 1 to FIG. 5. Here, FIG. 1 is a perspective view of the thermally assisted magnetic head 180 according to the embodiment of the present invention, FIG. 2 is a side view of the thermally assisted magnetic head 180 according to the embodiment of the present invention, FIG. 3 is a perspective view, with enlargement, of the principal part of the thermally assisted magnetic head 180. FIG. 4 is a sectional view of principal part taken along the line 4-4 in FIG. 1, FIG. 5 is a front view, partially omitted, illustrating a medium-opposing surface (Air Bearing Surface, which will hereinafter be referred also to as "ABS") 101 of the magnetic head part 100.

The thermally assisted magnetic head 180 has a slider 120 and a light source-unit 160 joined to the slider 120. The thermally assisted magnetic head 180 has a complex-slider-structure which the light source-unit 160 is joined to the slider 120.

The slider 120 has a slider-substrate 110 and the magnetic head part 100 formed on the slider-substrate 110.

The slider-substrate 110 is made of ceramic material such as aluminum oxide-titanium carbide ($Al_2O_3 \cdot TiC$) or the like, and it is formed in a rectangular parallelepiped shape. The slider-substrate 110 has the ABS 101 as the medium-opposing surface, opposing to the magnetic recording medium, a light source placing surface 111, arranged in the rear side of the ABS 101. A part, of the light source placing surface 111, of the magnetic head part 100 side is a light source-opposing surface 102. The light source-opposing surface 102 opposes to the later-described laser diode 130 of the light source-unit 160.

In the thermally assisted magnetic head 180, the reflecting-position of laser inside of the core layer 25 is set up to a later-described optimal reflecting-position 25$p$. Therefore, the unstableness of optical power caused by the mode-hopping is lowered.

(Magnetic Head Part)

Subsequently, the magnetic head part 100 will be explained with mainly reference to FIG. 4 to FIG. 5. The magnetic head part 100 has a reproducing head 90 and a recording head 91. The magnetic head part 100 has a structure which the reproducing head 90 and the recording head 91 are stacked.

The reproducing head 90 has an MR device 5, arranged near the ABS 101, for detecting a magnetic signal. The reproducing head 90 comprises a lower shield layer 3, a lower shield gap film 4, an upper shield gap film 6 and an upper shield layer 7.

Then, an insulating layer 2 is further formed on a thin-film laminated surface 111$a$ of the slider-substrate 110, and the lower shield layer 3 made of a magnetic material is formed on the insulating layer 2. Further, the lower shield gap film 4, as an insulating film, is formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has a thin-film coil 12, a return magnetic layer 20, a core layer 25, a lower dielectric-layer 24, an upper dielectric-layer 26, a near-field light generating layer 28, an overcoat layer 34, a main magnetic pole layer 40, and a linking magnetic pole layer 45, and has a structure in which they are stacked on the thin-film laminated surface 111$a$.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22. The connecting magnetic pole layer 21 has a magnetic pole end face 21$a$ arranged within the ABS 101 and has a portion that is more distant from the ABS 101 than is the magnetic pole end face 21$a$ being embedded in the insulating layer 8. The connecting magnetic pole layer 21 has a size reaching a position more distant from the ABS 101 than is the turn part 12D. To the connecting magnetic pole layer 21, the rear magnetic pole layer 22 is joined at a position more distant from the ABS 101 than is the turn part 12D.

The rear magnetic pole layer 22 is arranged at a position more distant from the ABS 101 than is the turn part 12D, and it is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a waveguide which guides laser light, generated by the later-described laser diode 130 of the light source-unit 160, from the light source-opposing surface 102 to the ABS 101. The core layer 25, as illustrated in FIG. 4, is formed along with a depth direction, passing through between the linking magnetic pole layer 45, from the ABS 101 to the light source-opposing surface 102.

The core layer 25 is formed with dielectric such as tantalum oxide ($TaO_x$) or the like. For example, the core layer 25 is able to be formed with $Ta_2O_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide ($AlO_x$) or the like. For example, the upper dielectric-layer 26 is able to be formed with alumina ($Al_2O_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide ($AlO_x$) or the like, similar with the upper dielectric-layer 26.

For example, the lower dielectric-layer 24 is able to be formed with alumina ($Al_2O_3$).

The near-field light generating layer 28 has a structure formed in a rectangular shape as a whole, seen from the ABS 101.

The near-field light generating layer 28 is made of metal and formed of, for example, one of Au, Ag, Al, Cu, Pd, Pt, Rh, Ir or an alloy made of a plurality of those elements.

The near-field light generating layer 28 has a bottom part 28c. The bottom part 28c is arranged at the deepest positions of the near-field light generating layer 28. The bottom part 28c extends from the ABS 101 in the depth direction. The end surface of the bottom part 28c on the ABS 101 side is arranged within the ABS 101. This end surface is a generating end part 28e. The generating end part 28e generates near-field light for heating the magnetic recording medium.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a front end part 41c.

The front surface including the front end part 41c constitutes the magnetic pole end surface 41g. The magnetic pole end surface 41g is arranged within the ABS 101. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the surface 41e of the magnetic pole end part layer 41.

The linking magnetic pole layer 45 is arranged in a manner to hold the core layer 25 from both right and left sides at a position more distant from the ABS 101 than is the thin-film coil 12. Further, the linking magnetic pole layer 45 is joined to the rear magnetic pole layer 22. The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Light Source-Unit)

Subsequently, the light source-unit 160 will be explained. The light source-unit 160 has the laser diode 130 and the sub-mount 150. The laser diode 130 is joined to the sub-mount 150 to constitute the light source-unit 160.

As illustrated in FIG. 4, the laser diode 130 has an n-substrate 140, a stripe n-electrode 141 having band like shape, a light emitting layer 145, and a stripe p-electrode 142 having band like shape, and it has a rectangle parallelepiped shape. In addition, the stripe n-electrode 141 is joined to a surface on the outside of the n-substrate 140. Further, the light emitting layer 145 is formed on a side of the n-substrate 140 opposite to the stripe n-electrode 141, and the stripe p-electrode 142 is joined on the light emitting layer 145, via a ground layer 143.

The light emitting layer 145 has an active layer 146, an n-cladding layer 147, and a p-cladding layer 148, and has a structure in which the active layer 146 is sandwiched between the n-cladding layer 147 and the p-cladding layer 148.

Then, the laser diode 130 is joined to the sub-mount 150 so that the active layer 146 opposes to the core layer 25, and an emitting part 149 is arranged in a part, of the light emitting layer 145, opposing to the core layer 25. The emitting part 149 is a part, of the laser diode 130, which emits the laser light. The laser diode 130 has an opposing-surface 131. The opposing-surface 131 is a part, of the surface of the laser diode 130, which opposes to the sub-mount 150. The opposing-surface 131 opposes to a later-described joint-surface 151 of the sub-mount 150.

The sub-mount 150 is made of a silicon (Si), and it is formed in a rectangular parallelepiped shape. The sub-mount 150 has a size larger than the laser diode 130. Further, the sub-mount 150 is able to be formed with semiconductor material such as GaAs, SiC or the like, or a ceramic material such as aluminum oxide-titanium carbide ($Al_2O_3$.TiC) or the like.

The sub-mount 150 of the light source-unit 160, having the above-described constitution, is joined to the slider 120 to constitute the thermally assisted magnetic head 180.

(Optimization of Reflecting-Position)

Figure 6:
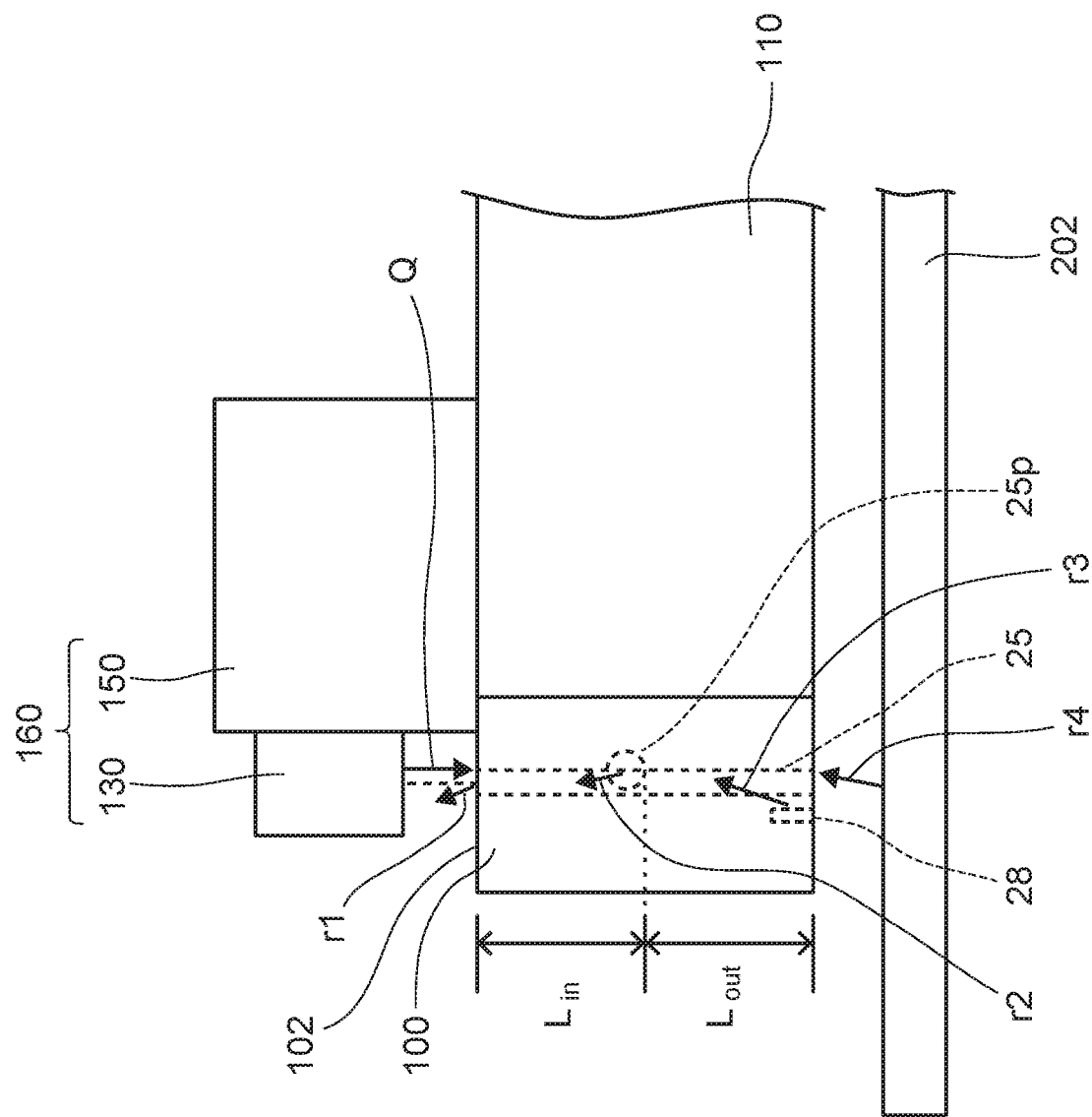
FIG. 6 is a side elevation view schematically showing an optimal reflecting-position, reflected light of the thermally assisted magnetic head.

In the thermally assisted magnetic head 180, the reflecting-position of laser light in inside of the core layer 25 (referred to also as an "internal reflecting-position") is optimized. Thereby, as illustrated in FIG. 6, in the thermally assisted magnetic head 180, the internal reflecting-position is set up to an optimal reflecting-position 25p.

It is necessary that the interference pattern of laser light becomes a pattern which wavelength dependence of the reflected light becomes periodic, so that the internal reflecting-position is set up to the optimal reflecting-position 25p. The interference pattern, of laser light concerning the laser diode 130 and the core layer 25, changes according to the following five parameters p1) to p5) (also referred to as "interference parameter").

p1) the length of the core layer 25
p2) the effective refractive index of the core layer 25
p3) intervals of the core layer 25 from the ABS 101 or the light source-opposing surface 102 to the reflecting-position
p4) the length of the internal waveguide of the laser diode 130
p5) the effective refractive index of the internal waveguide Therefore, it is necessary that the interference parameters p1) to p5) are set up in a certain range so that the internal reflecting-position is set up to the optimal reflecting-position 25p. In the thermally assisted magnetic head 180, the conditions, concerning the interference parameters p1) to p5), which the internal reflecting-position is set up to the optimal reflecting-position 25p, are defined as the following optimizing conditional expression. In the thermally assisted magnetic head 180, the optimizing conditional expression is satisfied, thereby the internal reflecting-position is set up to the optimal reflecting-position 25p.

Optimizing Conditional Expression $$m_1 \times L1 = L2 \ (m_1 \text{ is a natural number}) \quad \text{EX1}$$

$$m_2 \times L1 = L3 \ (m_2 \text{ is a natural number}) \quad \text{EX2}$$

$$m_3 \times L4 = L3 \ (m_3 \text{ is a natural number}) \quad \text{EX3}$$

As described later in detail, L1 is the optical path length concerning laser light passing through a later-described inlet-interval $L_{in}$, L2 is the optical path length concerning laser light passing through an outlet-interval $L_{out}$. L3 is the optical path length concerning laser light passing through the internal waveguide of the laser diode 130, L4 is the optical path length concerning laser light of the entire core layer 25. When the distance, which light travels actually, is dx, the refractive index of the medium is n, the optical path length is ndx.

Then, as illustrated in FIG. 6, when the laser light Q is emitted from the laser diode 130, part of the laser light Q is reflected on the light source-opposing surface 102, the core layer 25, the near-field light generating layer 28, the hard disk 202. As the result, optical feedback r1, r2, r3, r4 return back to the laser diode 130.

In the thermally assisted magnetic head 180, because the internal reflecting-position is set up to the optimal reflecting-position 25p, the unstableness of optical power, caused by the mode-hopping, is lowered.

Figure 7:
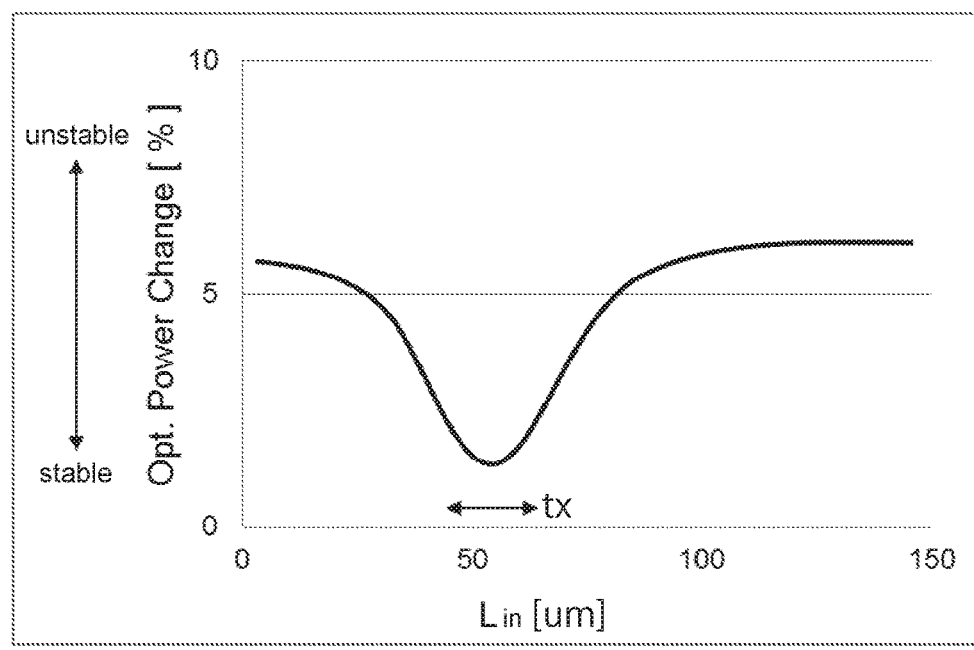
FIG. 7 is a graph showing a simulation result to investigate the relationship between the interval, of inside a core layer, from a light source-opposing surface to the reflecting-position and the size of the optical power change.

Here, FIG. 7 is a graph showing a simulation result to investigate the relationship between the interval, of inside the core layer 25, from the light source-opposing surface 102 to the reflecting-position and size of the optical power change. The horizontal axis in FIG. 7 shows the inlet-interval $L_{in}$ (will be described later in detail) illustrated in FIG. 8, the vertical axis shows the size of the optical power change. When numeric value of the vertical axis is large, the optical power becomes unstable, when numeric value of the vertical axis is small, the optical power becomes stable.

As illustrated in FIG. 7, when the inlet-interval $L_{in}$ is shows numeric value within a certain range tx, the optical power becomes stable. Namely, minimal value exists in the optical power change. The optimal reflecting-position 25p is able to be set up by the inlet-interval $L_{in}$, when the optical power change is limited in the certain range tx including such as the minimal value. The above-described optimizing conditional expression is satisfied on this case. The thermally assisted magnetic head 180 has an optimal-structure, which the optimizing conditional expression is satisfied. Namely, the internal reflecting-position is set up to the optimal reflecting-position 25p, in the thermally assisted magnetic head 180.

Figure 8:
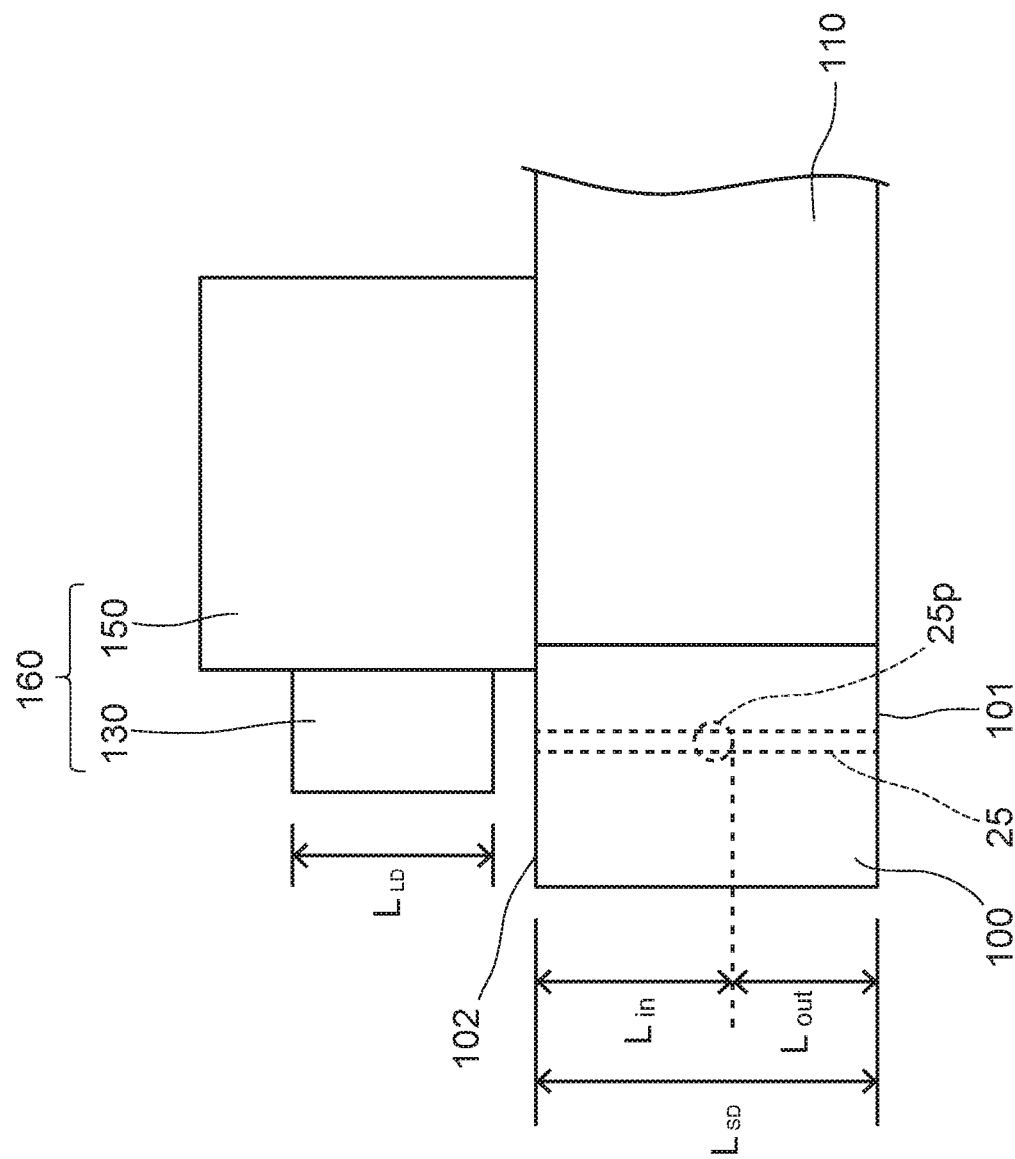
FIG. 8 is a side elevation view showing a magnetic head part, a light source unit and a slider substrate which the reflecting-position is set up to the optimal reflecting-position.

Then the magnetic head part 100, which the internal reflecting-position is set up to the optimal reflecting-position 25p, is shown in FIG. 8. In this case, inside of the core layer 25, the interval, from the light source-opposing surface 102 to the optimal reflecting-position 25p, is the inlet-interval $L_{in}$, the interval, from the optimal reflecting-position 25p to the ABS 101, is the outlet-interval $L_{out}$. Further, the total length of the core layer 25 (thickness of the slider-substrate 110) is a core layer length $L_{SD}$. The total length of the internal waveguide of the laser diode 130 is internal waveguide length $L_{LD}$.

Then, total length of the internal waveguide of the laser diode 130 is the internal waveguide length $L_{LD}$ though, it means that parallel mirrors $R_r$, $R_f$ are arranged at positions away from each other with size of the internal waveguide length $L_{LD}$. Then, in the laser diode 130, the laser light Q oscillates at a frequency defined by the parallel mirrors Rr, Rf.

Figure 9:
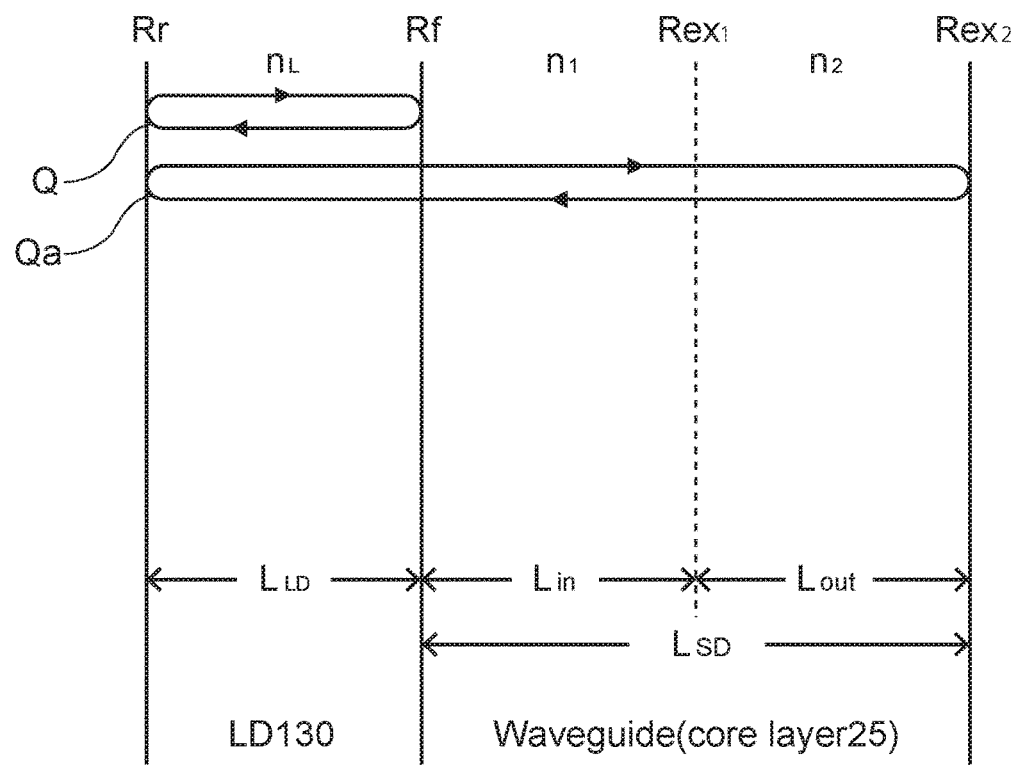
FIG. 9 is a view showing laser light, reflected light of the case which a first optimizing conditional expression is satisfied in the laser diode and the core layer, having optical feedback.

Here, as illustrated in FIG. 9, for example, the case, which the optical feedback Qa is added to the laser light Q, is supposed. As the optical feedback Qa, the light reflected in inside the core layer 25 (corresponding to the light reflected by the reflection mirrors $R_{ex1}$, in FIG. 9) and the light reflected near the ABS 101 are supposed. In this case, the reflection mirror $R_{ex1}$ corresponds to the optimal reflecting-position 25p, the reflection mirror $R_{ex2}$ corresponds to the near-field light generating layer 28.

As described above, the interval of the core layer 25, from the light source-opposing surface 102 to the optimal reflecting-position 25p, is the inlet-interval $L_{in}$, the interval, from the optimal reflecting-position 25p to the ABS 101, is the outlet-interval $L_{out}$.

Therefore, if effective refractive index (refractive index found by considering the spatial distribution inside of the dielectric) of the inlet-interval $L_{in}$ is $n_1$, effective refractive index of the outlet-interval $L_{out}$ is $n_2$, optical path length of the inlet-interval $L_{in}$ (corresponding to an inlet-optical path length of the present invention) L1 is $n_1 \times L_{in}$ (the product of the effective refractive index $n_1$ and the inlet-interval $L_{in}$). Further, optical path length of the outlet-interval $L_{out}$ (corresponding to an outlet-optical path length of the present invention) L2 is $n_2 \times L_{out}$.

When the size of the natural number times the inlet-optical path length L1 is equal to the outlet-optical path length L2, namely, the following EX1 is satisfied, the internal reflecting-position is set up to the optimal reflecting-position 25p, the unstableness of optical power caused by the mode-hopping is lowered. The following EX1 is one of the optimizing conditional expression (first optimizing conditional expression).

$$m_1 \times L1 = L2 \ (m_1 \text{ is a natural number}) \quad \text{EX1}$$

Figure 10:
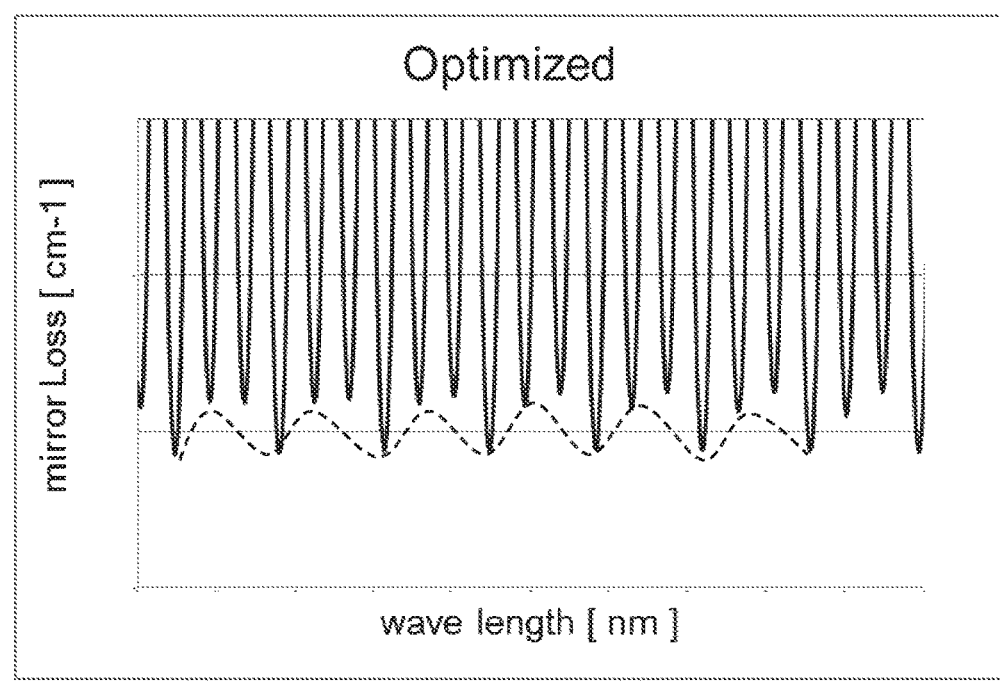
FIG. 10 is the graph showing a relationship between wavelength and mirror loss when the reflecting-position is optimized.
Figure 11:
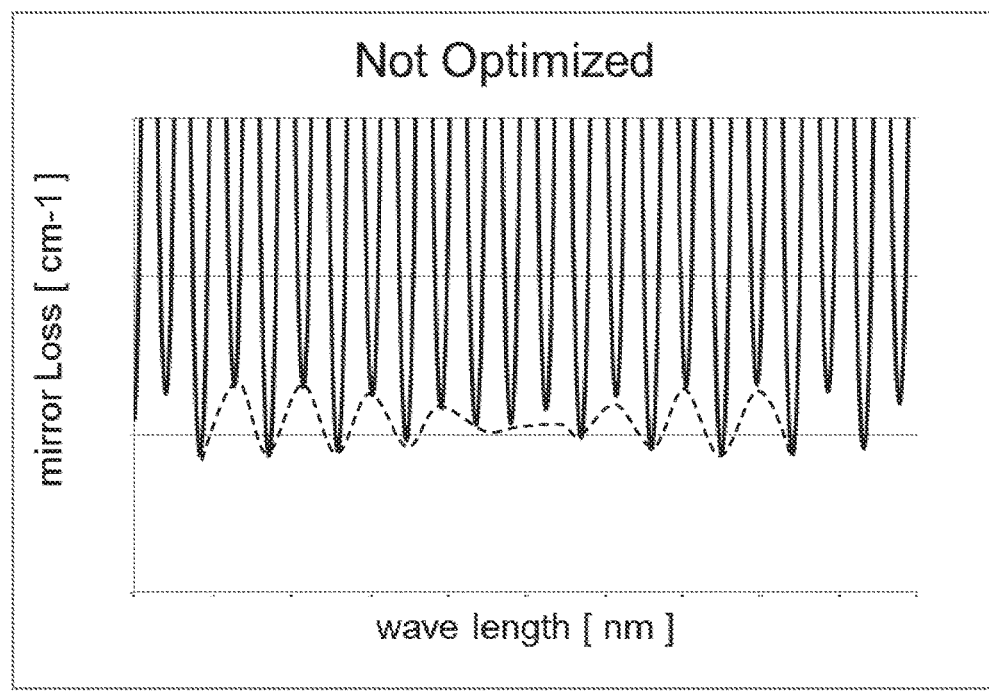
FIG. 11 is the graph showing a relationship between wavelength and mirror loss when the reflecting-position is not optimized.

Here, FIG. 10 is the graph showing a relationship between wavelength and mirror loss when the reflecting-position is optimized, FIG. 11 is the graph showing a relationship between wavelength and mirror loss when the reflecting-position is not optimized. Both horizontal axes show the wavelength, vertical axes show the mirror loss. As illustrated in FIGS. 10, 11, when the reflecting-position is optimized, the waveform, illustrated in the graph, is periodic. This is useful for the unstableness of optical power.

When the size of the natural numbers times the inlet-optical path length L1 is equal to the optical path length of the internal waveguide of the laser diode 130 (corresponding to a light-source optical path length of the present invention) L3, namely, the following EX2 is satisfied, the internal reflecting-position is set up to the optimal reflecting-position 25p, the unstableness of optical power, caused by the mode-hopping, is lowered.

The following EX2 is also one of the optimizing conditional expression (second optimizing conditional expression). If the effective refractive index of the internal waveguide of the laser diode 130 is $n_L$, the light-source optical path length L3 is $n_L \times L_{LD}$.

$$m_2 \times L1 = L3 \ (m_2 \text{ is a natural number}) \quad \text{EX2}$$

When the size of the natural numbers times the optical path length about all interval along length direction of the core layer 25 (corresponding to a waveguide-optical path length of the present invention) L4 is equal to the light-source path length L3, namely, the following EX3 is satisfied, the internal reflecting-position is set up to the optimal reflecting-position 25p, the unstableness of optical power, caused by the mode-hopping, is lowered. The following EX3 is also one of the optimizing conditional expression (third optimizing conditional expression). Because the waveguide-optical path length L4 is the sum of the optical path length of the inlet-interval $L_{in}$ and the optical path length of the outlet-interval $L_{out}$, the waveguide-optical path length L4 is $n_1 \times L_{in} + n_2 \times L_{out}$ (=L1+L2).

$$m_3 \times L4 = L3 \ (m_3 \text{ is a natural number}) \quad \text{EX3}$$

The reflecting-position of the core layer 25 becomes the optimal reflecting-position 25p on all the cases of the above-described EX1 is satisfied, the EX2 is satisfied, and the EX3 is satisfied. Therefore, the thermally assisted magnetic head, which the optimizing conditional expression is satisfied, brings the effect that the unstableness of optical power caused by the mode-hopping is lowered.

Further, the case which each one of the optimizing conditional expression of EX1, EX2, EX3 is respectively satisfied, and also the case which at least two of the optimizing conditional expression are satisfied (for example, EX1 and EX3 are satisfied), the unstableness of optical power caused by the mode-hopping is lowered.

(Definition of Internal Reflecting-Position)

As describe-above, the internal reflecting-position of the case, which the optimizing conditional expression of EX1, EX2, EX3 is respectively satisfied (or at least two of the optimizing conditional expression are satisfied), is the optimal reflecting-position 25p. In the magnetic head part 100, it is necessary that the reflecting-position is defined in the core layer 25 so that the internal reflecting-position is set up to the optimal reflecting-position 25p. When at least any one of the optimizing conditional expressions of EX1, EX2, EX3 is satisfied, concerning the definite reflecting-position, the reflecting-position is the optimal reflecting-position 25p.

Figure 12:
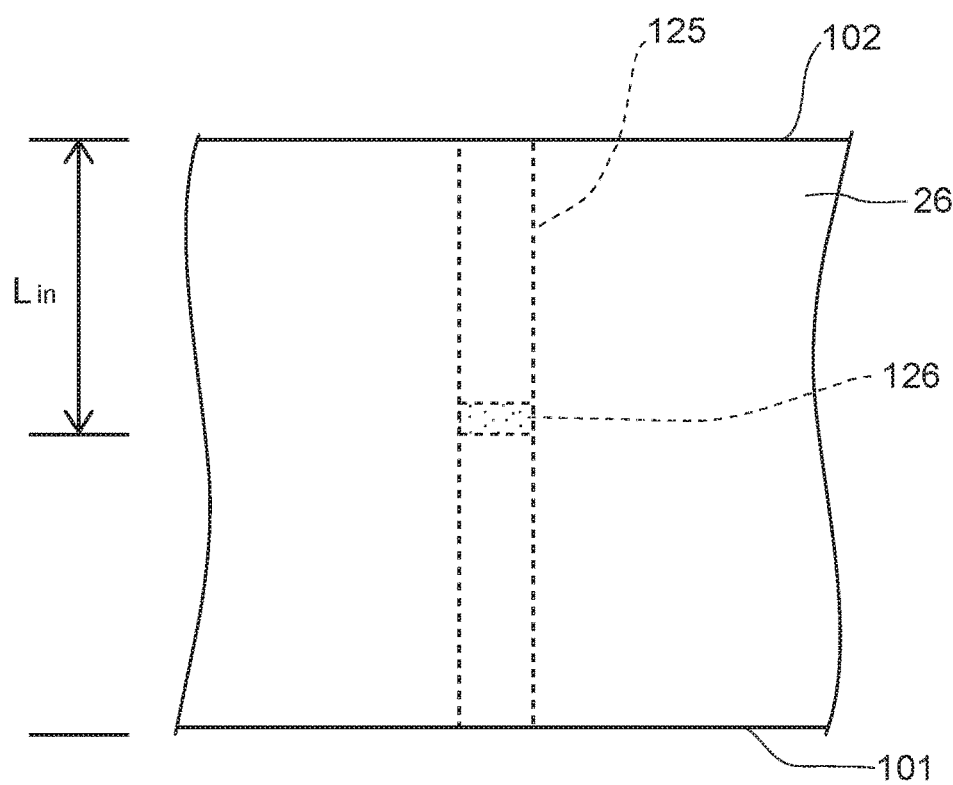
FIG. 12 is a plan view showing the core layer having a reflector in the middle part.

Here, the core layer 125, having a reflector 126 in the middle position, is shown in FIG. 12. In the case which the core layer 125 is formed in the magnetic head part 100, the inlet-interval $L_{in}$ is decided by the interval from the light source-opposing surface 102 to the reflector 126. Therefore, the reflecting-position is defined easily.

Figure 13:
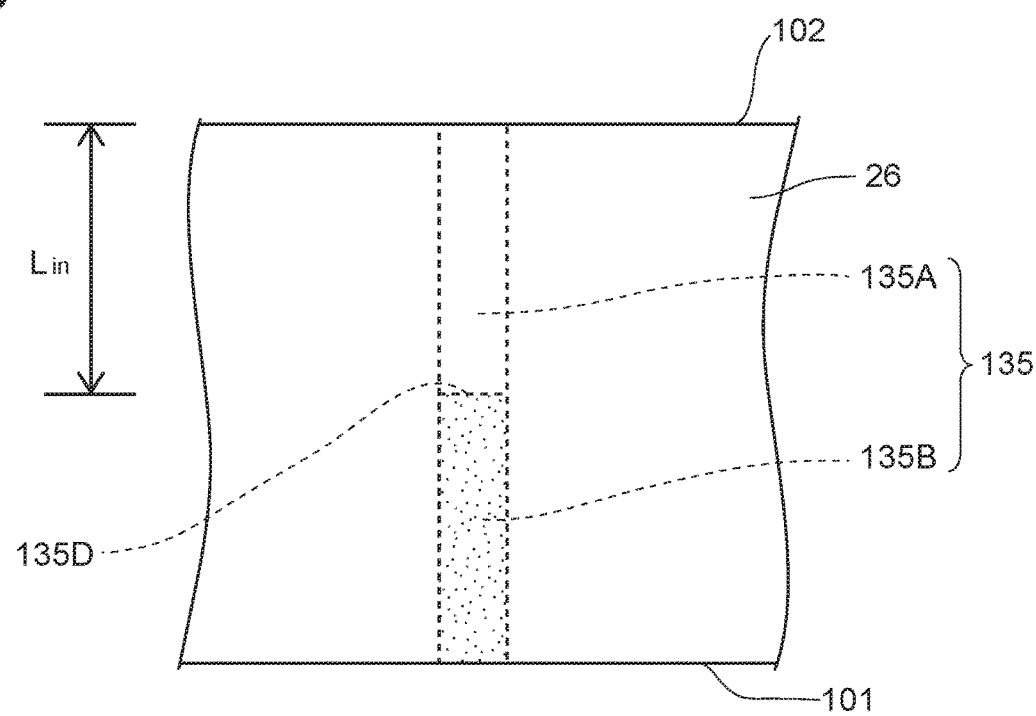
FIG. 13 is a plan view showing the core layer having a first, second core part.

Further, the core layer 135, having a first core part 135A (first dielectric member) made of first dielectric and a second core part 135B (second dielectric member) made of second dielectric, is shown in FIG. 13. In the case which the core layer 135 is formed in the magnetic head part 100, the inlet-interval $L_{in}$ is defined by the interval from the light source-opposing surface 102 to the boundary part 135D between the first core part 135A and the second core part 135B. Namely, because the boundary part 135D is defined as the reflecting-position, the reflecting-position is defined easily.

Figure 14:
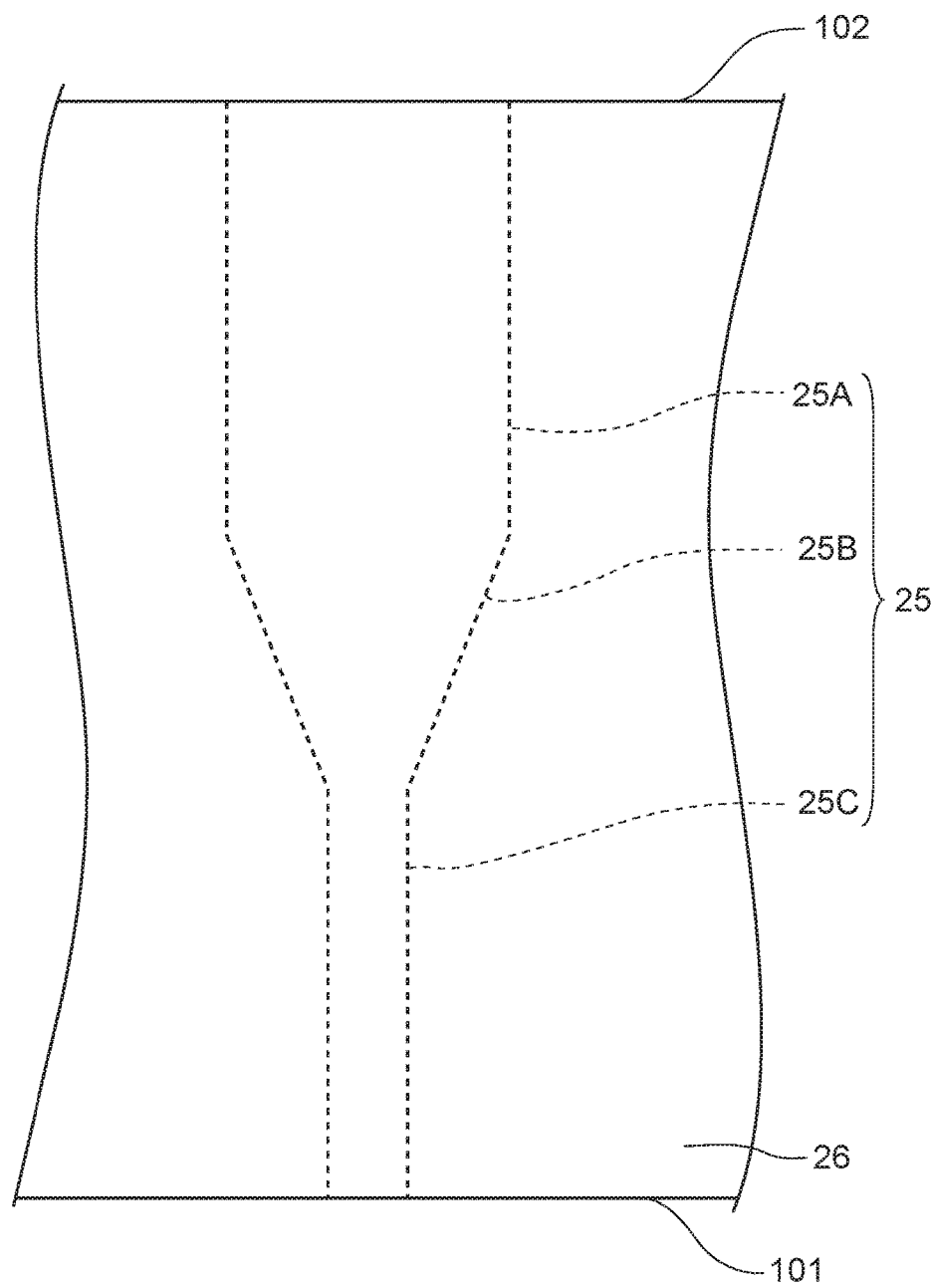
FIG. 14 is a plan view showing the core layer having a narrow-structure.

However, as illustrated in FIG. 14, when the core layer 25 has a narrow structure including a wide-width part 25A, a width-changing part 25B and a narrow-width part 25C, it is difficult that the reflecting-position is defined. In this case, the reflecting-position is defined according to the following reflecting-position defining method.

The reflecting-position defining method includes a reflectance measuring step, a corresponding diagram forming step, a period decision step and a reflecting-position calculating step.

Figure 15:
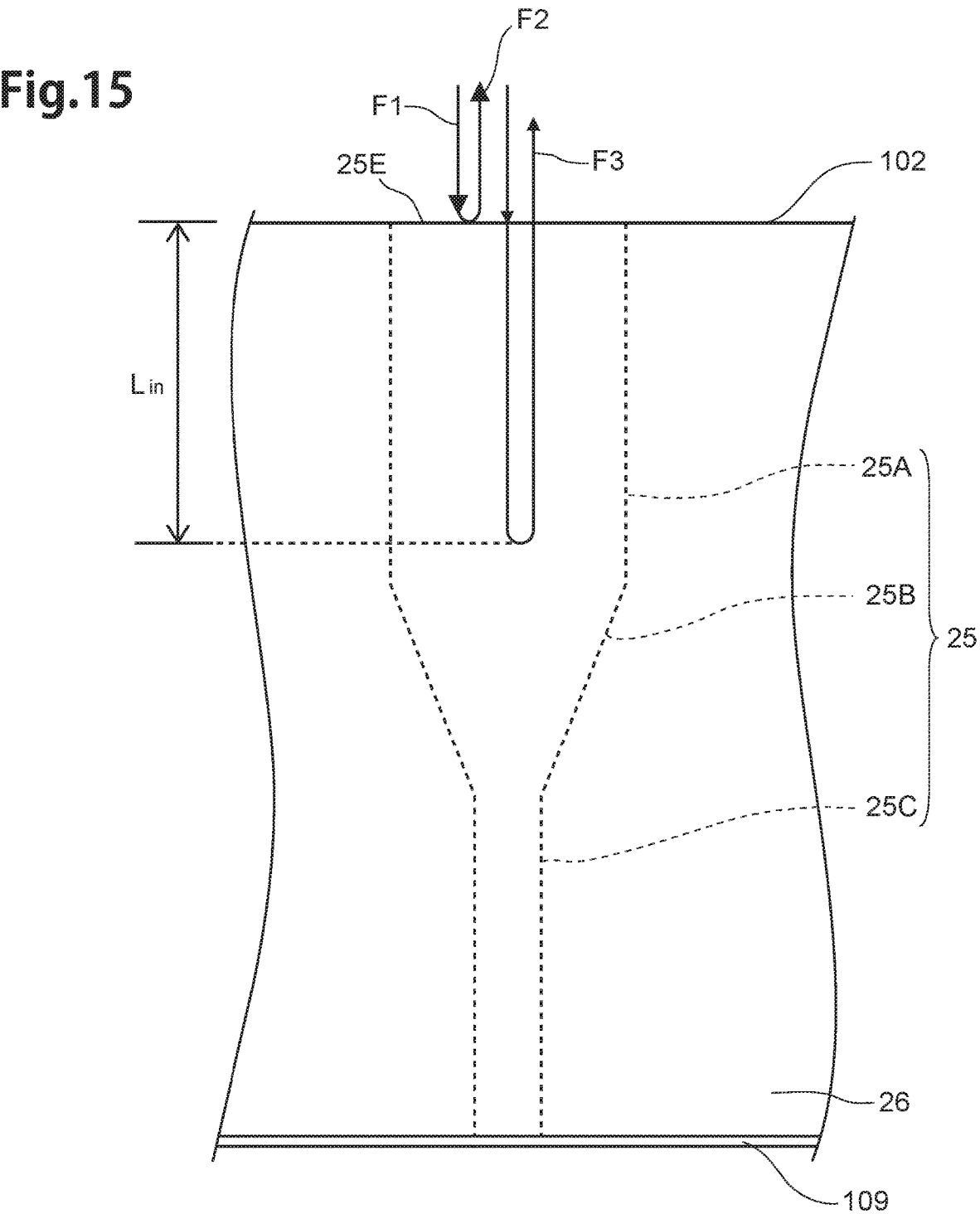
FIG. 15 is a plan view showing the case which a test-input light is input to the core layer having the narrow-structure.

In the reflectance measuring step, as illustrated in FIG. 15, a plurality of light F1, having different wavelength (also referred to as "test-input light") are input from the light source-opposing surface 102, reflectance (reflection rate) of the reflected light F2, F3 is measured. In this case, for example, wavelength tunable light source is used, light having a variety of wavelength is input into the inlet 25E of the core layer 25. The obtained reflectance is also referred to measured reflectance.

Next, in the corresponding diagram forming step, the corresponding diagram, showing the relationship between the input wavelength and the measured reflectance, is formed. The input wavelength is wavelength of the test-input light F1.

Figure 16:
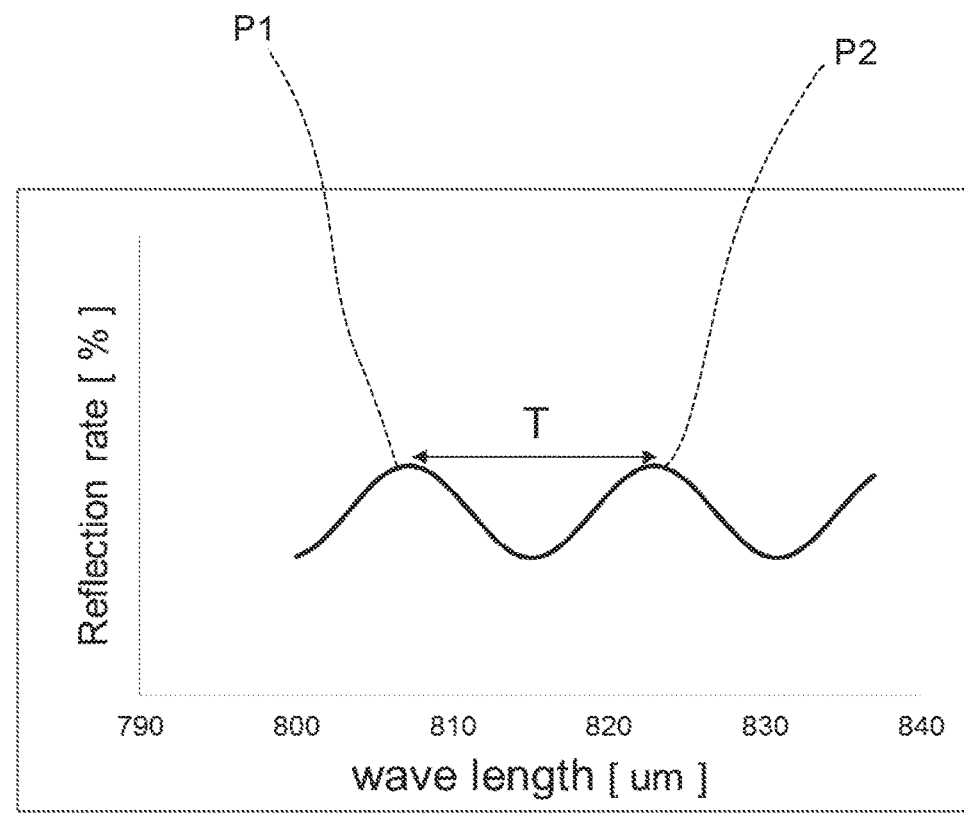
FIG. 16 is an example of a corresponding diagram used for a reflecting-position defining method.

In the subsequent period decision step, a wavelength period is decided using the corresponding diagram formed in the corresponding diagram forming step. When the wavelength of the test-input light F1 change, the interference pattern of the light also changes. Then, for example, as illustrated in FIG. 16, peaks of the measured reflectance, such as peaks P1, P2, emerge periodically. Interval of adjacent to peaks such as peaks P1, P2 is set up to a peak period T.

Then, in the reflecting-position calculating step, the reflecting-position is calculated according to the following reflecting-position calculating expression. In the reflecting-position calculating expression, the inlet-optical path length L1 is calculated using the peak period T, decided by the period decision step and an average wavelength λ, between the adjacent peaks. Then, because the L1 is $n_1 \times L_{in}$, when the effective refractive index $n_1$ is calculated, the inlet-interval $L_{in}$ is decided. Because the inlet-interval $L_{in}$ is interval of the core layer 25 from the light source-opposing surface 102 to the optimal reflecting-position 25p, when the inlet-interval $L_{in}$ is decided, the reflecting-position is calculated.

$$L1 = \lambda^2/2T \qquad \text{Reflecting-position calculating expression}$$

When the reflecting-position is defined by the reflecting-position defining method, as illustrated in FIG. 15, it is preferable that an AR coat layer 109 is formed on the core layer 25 of the ABS 101 side. When the AR coat layer 109 is formed, measuring accuracy of the reflectance is improved.

(Embodiments of Head Gimbal Assembly and Hard Disk Drive)

Next, embodiments of the head gimbal assembly and hard disk drive will now be explained with reference to FIG. 17 to FIG. 18.

Figure 17:
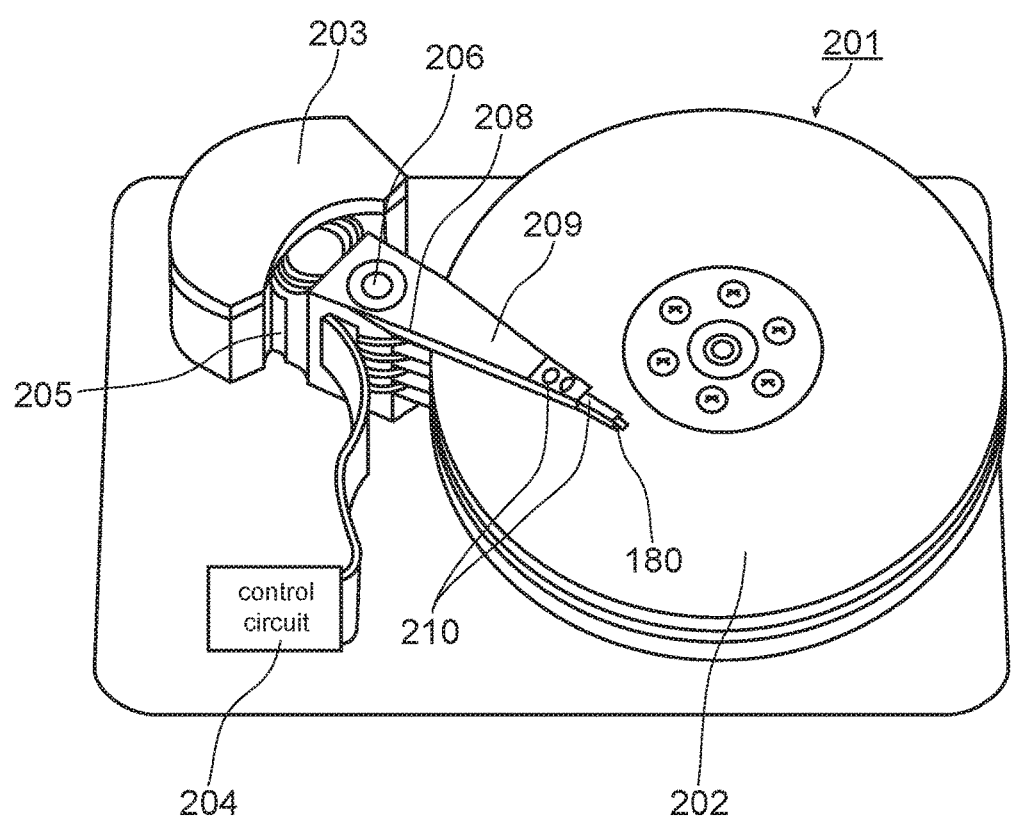
FIG. 17 is a perspective view illustrating a hard disk drive equipped with the thermally assisted magnetic head in FIG. 1.

FIG. 17 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 130.

Figure 18:
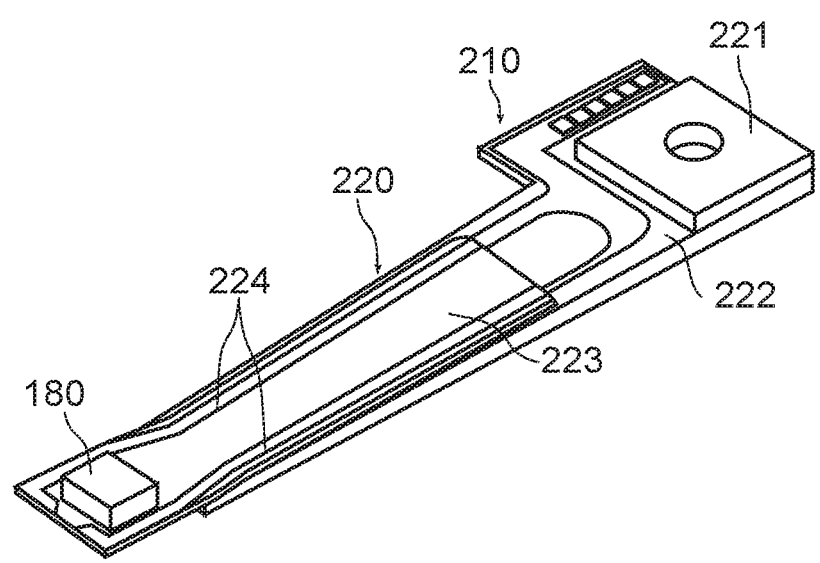
FIG. 18 is a perspective view illustrating a rear side of the HGA.

FIG. 18 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby the unstableness of optical power caused by the mode-hopping is lowered.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thermally assisted magnetic head comprising:
a slider; and
a light source-unit joined to the slider,
wherein the slider comprises a slider substrate and a magnetic head part formed on the slider substrate,
wherein the light source-unit comprises a laser diode and a sub-mount which the laser diode is joined;
wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface,
wherein the thermally assisted magnetic head comprises an optimal-structure which the following optimizing conditional expression, using an inlet-optical path length L1 of an inlet-interval of the waveguide from the light source-opposing surface to a reflecting-position of the laser light, and an outlet-optical path length L2 of an outlet-interval from the reflecting-position to the air bearing surface, is satisfied, $$m_1 \times L1 = L2 \; (m_1 \text{ is } a \text{ natural number}).$$

2. A thermally assisted magnetic head comprising:
a slider; and
a light source-unit joined to the slider,
wherein the slider comprises a slider substrate and a magnetic head part formed on the slider substrate,
wherein the light source-unit comprises a laser diode and a sub-mount which the laser diode is joined;
wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface,
wherein the thermally assisted magnetic head comprises an optimal-structure which the following optimizing conditional expression, using an inlet-optical path length L1 of an inlet-interval of the waveguide from the light source-opposing surface to a reflecting-position of the laser light, and a light-source optical path length L3 of an internal waveguide of the laser diode, is satisfied, $$m_2 \times L1 = L3 \; (m_2 \text{ is } a \text{ natural number}).$$

3. A thermally assisted magnetic head comprising:
a slider; and
a light source-unit joined to the slider,
wherein the slider comprises a slider substrate and a magnetic head part formed on the slider substrate,
wherein the light source-unit comprises a laser diode and a sub-mount which the laser diode is joined;

wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface, wherein the thermally assisted magnetic head comprises an optimal-structure which the following optimizing conditional expression, using a light-source optical path length L3 of an internal waveguide of the laser diode and a waveguide-optical path length L4 of all interval along length direction of the waveguide, is satisfied, $m_3 \times L4 = L3$ ($m_3$ is a natural number).

4. A thermally assisted magnetic head comprising:

a slider; and a light source-unit joined to the slider, wherein the slider comprises a slider substrate and a magnetic head part formed on the slider substrate, wherein the light source-unit comprises a laser diode and a sub-mount which the laser diode is joined;

wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface, wherein the thermally assisted magnetic head comprises an optimal-structure which at least any two of the following the first, second, third optimizing conditional expressions, using an inlet-optical path length L1 of an inlet-interval of the waveguide from the light source-opposing surface to a reflecting-position of the laser light, an outlet-optical path length L2 of an outlet-interval from the reflecting-position to the air bearing surface, a light-source optical path length L3 of an internal waveguide of the laser diode and a waveguide-optical path length L4 of all interval along length direction of the waveguide, are satisfied, $m_1 \times L1 = L2$ ($m_1$ is a natural number)    first optimizing conditional expression $m_2 \times L1 = L3$ ($m_2$ is a natural number)    second optimizing conditional expression $m_3 \times L4 = L3$ ($m_3$ is a natural number).    third optimizing conditional expression 5. The thermally assisted magnetic head according to claim 1, wherein the waveguide comprises a first dielectric member arranged the light source-opposing surface side and a second dielectric member arranged the air bearing surface side, and the boundary part, between the first dielectric member and the second dielectric member, is defined as the reflecting-position.

6. A head gimbal assembly comprising a thermally assisted magnetic head, wherein the thermally assisted magnetic head comprising:

a slider; and a light source-unit joined to the slider, wherein the slider comprises a slider substrate and a magnetic head part formed on the slider substrate, wherein the light source-unit comprises a laser diode and a sub-mount which the laser diode is joined;

wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface, wherein the thermally assisted magnetic head comprises an optimal-structure which the following optimizing conditional expression, using an inlet-optical path length L1 of an inlet-interval of the waveguide from the light source-opposing surface to a reflecting-position of the laser light, and an outlet-optical path length L2 of an outlet-interval from the reflecting-position to the air bearing surface, is satisfied, $m_1 \times L1 = L2$ ($m_1$ is a natural number).

7. The head gimbal assembly according to claim 6, wherein the thermally assisted magnetic head comprises a second optimal-structure which the following optimizing conditional expression, using the inlet-optical path length L1 and a light-source optical path length L3 of an internal waveguide of the laser diode, is satisfied, $m_2 \times L1 = L3$ ($m_2$ is a natural number).

8. The head gimbal assembly according to claim 6, wherein the thermally assisted magnetic head comprises a third optimal-structure which the following optimizing conditional expression, using a light-source-optical path length L3 of an internal waveguide of the laser diode and a waveguide-optical path length L4 of all interval along length direction of the waveguide, is satisfied, $m_3 \times L4 = L3$ ($m_3$ is a natural number).

9. A hard disk drive comprising a head gimbal assembly having a thermally assisted magnetic head, and a magnetic recording medium opposing the thermally assisted magnetic head, wherein the thermally assisted magnetic head comprising:

a slider; and a light source-unit joined to the slider, wherein the slider comprises a slider substrate and a magnetic head part formed on the slider substrate, wherein the light source-unit comprises a laser diode and a sub-mount which the laser diode is joined;

wherein the magnetic head part comprises an air bearing surface opposing a magnetic recording medium, a light source-opposing surface arranged rear side of the air bearing surface and a waveguide which guides laser light, output from the laser diode, from the light source-opposing surface to the air bearing surface, wherein the thermally assisted magnetic head comprises an optimal-structure which the following optimizing conditional expression, using an inlet-optical path length L1 of an inlet-interval of the waveguide from the light source-opposing surface to a reflecting-position of the laser light, and an outlet-optical path length L2 of an outlet-interval from the reflecting-position to the air bearing surface, is satisfied, $m_1 \times L1 = L2$ ($m_1$ is a natural number).

10. The hard disk drive according to claim 9, wherein the thermally assisted magnetic head comprises a second optimal-structure which the following optimizing conditional expression, using the inlet-optical path length L1 and a light-source optical path length L3 of an internal waveguide of the laser diode, is satisfied, $m_2 \times L1 = L3$ ($m_2$ is a natural number).

11. The hard disk drive according to claim 9,
wherein the thermally assisted magnetic head comprises a third optimal-structure which the following optimizing conditional expression, using a light-source optical path length L3 of an internal waveguide of the laser diode and a waveguide-optical path length L4 of all interval along length direction of the waveguide, is satisfied, $m_3 \times L4 = L3$ ($m_3$ is a natural number).

* * * * *